United States Patent
Halpern

(10) Patent No.: US 7,149,714 B1
(45) Date of Patent: Dec. 12, 2006

(54) AUTOMATED TARGETED AND PROPORTIONAL INVESTMENT MANAGEMENT SYSTEMS AND METHODS

(76) Inventor: Richard G. Halpern, 44 Fernhill Rd., Springfield, NJ (US) 07081

( * ) Notice: Subject to any disclaimer, the term of this patent is extended or adjusted under 35 U.S.C. 154(b) by 409 days.

(21) Appl. No.: 09/432,099

(22) Filed: Nov. 2, 1999

Related U.S. Application Data

(60) Provisional application No. 60/123,714, filed on Mar. 10, 1999.

(51) Int. Cl.
*G06Q 40/00* (2006.01)

(52) U.S. Cl. .................................................. 705/36 R

(58) Field of Classification Search ................. 705/36, 705/35, 36 R, 36 T, 37
See application file for complete search history.

(56) References Cited

U.S. PATENT DOCUMENTS

| | | | | |
|---|---|---|---|---|
| 4,648,037 A | | 3/1987 | Valentino | 364/408 |
| 4,674,044 A | * | 6/1987 | Kalmus | 705/37 |
| 4,750,121 A | | 6/1988 | Halley et al. | 364/408 |
| 4,933,842 A | | 6/1990 | Durbin et al. | 364/408 |
| 4,953,085 A | | 8/1990 | Atkins | 364/408 |
| 4,969,094 A | | 11/1990 | Halley et al. | 364/408 |
| 4,994,964 A | | 2/1991 | Wolfberg et al. | 364/408 |
| 5,095,429 A | | 3/1992 | Harris et al. | 364/408 |
| 5,132,899 A | | 7/1992 | Fox | 364/408 |
| 5,214,579 A | | 5/1993 | Wolfberg et al. | 364/408 |
| 5,227,967 A | | 7/1993 | Bailey | 364/408 |
| 5,313,560 A | * | 5/1994 | Maruoka et al. | 706/50 |
| 6,014,643 A | * | 1/2000 | Minton | 705/37 |
| 6,035,286 A | * | 3/2000 | Fried | 705/38 |
| 6,272,474 B1 | * | 8/2001 | Garcia | 705/37 |
| 6,317,728 B1 | * | 11/2001 | Kane | 705/37 |

OTHER PUBLICATIONS

Goodman, John E. "Everybody's Money Book" Dearborn Financial Publishing, Inc., Dec. 1997.*
White, Ron, How Computers Work, Millennium Ed. Que Corporation, Sep. 1999.*

* cited by examiner

*Primary Examiner*—Andrew J. Fischer
(74) *Attorney, Agent, or Firm*—Finnegan, Henderson, Farabow, Garrett & Dunner, L.L.P.

(57) ABSTRACT

Systems and methods consistent with this invention automatically control investments by forcing liquidations when the investment value exceeds a target amount, and forcing additional investment when the investment value falls below the target amount. The amount of the additional investment or liquidation depends upon the difference between the value and the investment target.

11 Claims, 15 Drawing Sheets

PAGE 1
INVESTDJ

DJIA

V990305

| YEAR | OPENING PRICE PER SHARE | PERCENTAGE CHANGE FOR YEAR | BEGIN TARGET EQUITY BALANCE | INVESTMENT OR (REDEMPTION) | # OF SHARES PURCHASED OR (SOLD) | TOTAL # OF SHARES OWNED | END ACTUAL EQUITY BALANCE | END NET INVESTMENT TO DATE | END NET PROFIT OR (LOSS) TO DATE |
|---|---|---|---|---|---|---|---|---|---|
| 1929 | 300.00 | -17.17% | 10,000 | 10,000 | 33.33 | 33.33 | 8,283 | 10,000 | (1,717) |
| 1930 | 248.48 | -33.77% | 20,000 | 11,717 | 47.16 | 80.49 | 13,247 | 21,717 | (8,470) |
| 1931 | 164.58 | -52.67% | 30,000 | 16,753 | 101.79 | 182.28 | 14,200 | 38,470 | (24,271) |
| 1932 | 77.90 | -23.07% | 40,000 | 25,800 | 331.20 | 513.48 | 30,773 | 64,271 | (33,498) |
| 1933 | 59.93 | 66.69% | 50,000 | 19,227 | 320.83 | 834.31 | 83,347 | 83,498 | (151) |
| 1934 | 99.90 | 4.14% | 60,000 | (23,347) | (233.71) | 600.60 | 62,486 | 60,151 | 2,336 |
| 1935 | 104.04 | 38.53% | 70,000 | 7,514 | 72.22 | 672.82 | 96,973 | 67,664 | 29,309 |
| 1936 | 144.13 | 24.82% | 80,000 | (16,973) | (117.76) | 555.05 | 99,854 | 50,691 | 49,163 |
| 1937 | 179.90 | -32.82% | 90,000 | (9,854) | (54.78) | 500.28 | 60,459 | 40,837 | 19,622 |
| 1938 | 120.85 | -28.06% | 100,000 | 39,541 | 327.19 | 827.47 | 128,060 | 80,378 | 47,682 |
| 1939 | 154.76 | -2.92% | 110,000 | (18,060) | (116.69) | 710.78 | 106,787 | 62,318 | 44,469 |
| 1940 | 150.24 | -12.72% | 120,000 | 13,213 | 87.94 | 798.72 | 104,736 | 75,531 | 29,205 |
| 1941 | 131.13 | -15.38% | 130,000 | 25,264 | 192.66 | 991.38 | 110,004 | 100,795 | 9,209 |
| 1942 | 110.96 | 7.61% | 140,000 | 29,996 | 270.33 | 1,261.72 | 150,649 | 130,791 | 19,858 |
| 1943 | 119.40 | 13.81% | 150,000 | (649) | (5.43) | 1,256.28 | 170,716 | 130,142 | 40,574 |
| 1944 | 135.89 | 12.09% | 160,000 | (10,716) | (78.86) | 1,177.42 | 179,345 | 119,426 | 59,919 |
| 1945 | 152.32 | 26.65% | 170,000 | (9,345) | (61.35) | 1,116.07 | 215,301 | 110,081 | 105,221 |
| 1946 | 192.91 | -8.14% | 180,000 | (35,301) | (182.99) | 933.08 | 165,341 | 74,779 | 90,562 |
| 1947 | 177.20 | 2.23% | 190,000 | 24,659 | 139.16 | 1,072.23 | 194,246 | 99,438 | 94,808 |
| 1948 | 181.16 | -2.13% | 200,000 | 5,754 | 31.76 | 1,104.00 | 195,739 | 105,192 | 90,546 |
| 1949 | 177.30 | 12.88% | 210,000 | 14,261 | 80.44 | 1,184.43 | 237,041 | 119,454 | 117,587 |
| 1950 | 200.13 | 17.63% | 220,000 | (17,041) | (85.15) | 1,099.29 | 258,783 | 102,413 | 156,370 |
| 1951 | 235.41 | 14.37% | 230,000 | (28,783) | (122.27) | 977.02 | 263,043 | 73,630 | 189,413 |
| 1952 | 269.23 | 8.42% | 240,000 | (23,043) | (85.59) | 891.43 | 260,209 | 50,587 | 209,621 |
| 1953 | 291.90 | -3.77% | 250,000 | (10,209) | (34.97) | 856.46 | 240,579 | 40,379 | 200,200 |
| 1954 | 280.90 | 43.96% | 260,000 | 19,421 | 69.14 | 925.60 | 374,302 | 59,800 | 314,502 |
| 1955 | 404.39 | 20.77% | 270,000 | (104,302) | (257.92) | 667.67 | 326,091 | (44,502) | 370,593 |
| 1956 | 488.40 | 2.27% | 280,000 | (46,091) | (94.37) | 573.30 | 286,346 | (90,593) | 376,940 |
| 1957 | 499.47 | -12.77% | 290,000 | 3,654 | 7.31 | 580.62 | 252,968 | (86,940) | 339,908 |
| 1958 | 435.69 | 33.96% | 300,000 | 47,032 | 107.95 | 688.56 | 401,880 | (39,908) | 441,788 |
| 1959 | 583.65 | 16.40% | 310,000 | (91,880) | (157.42) | 531.14 | 360,835 | (131,788) | 492,623 |
| 1960 | 679.36 | -9.34% | 320,000 | (40,835) | (60.11) | 471.03 | 290,104 | (172,623) | 462,727 |
| 1961 | 615.89 | 18.71% | 330,000 | 39,896 | 64.78 | 535.81 | 391,747 | (132,727) | 524,474 |
| 1962 | 731.13 | -10.81% | 340,000 | (51,747) | (70.78) | 465.03 | 303,248 | (184,474) | 487,722 |
| 1963 | 652.10 | 17.00% | 350,000 | 46,752 | 71.69 | 536.73 | 409,496 | (137,722) | 547,218 |
| 1964 | 762.95 | 14.57% | 360,000 | (49,496) | (64.87) | 471.85 | 412,461 | (187,218) | 599,679 |

FIG. 5a

PAGE 2                          DJIA

| YEAR | OPENING PRICE PER SHARE | PERCENTAGE CHANGE FOR PRIOR YEAR | BEGIN TARGET EQUITY BALANCE | INVESTMENT OR (REDEMPTION) | # OF SHARES PURCHASED OR (SOLD) | TOTAL # OF SHARES OWNED | END ACTUAL EQUITY BALANCE | END NET INVESTMENT TO DATE | END NET PROFIT OR (LOSS) TO DATE |
|---|---|---|---|---|---|---|---|---|---|
| 1965 | 874.13 | 10.88% | 370,000 | (42,461) | (48.57) | 423.28 | 410,266 | (229,679) | 639,945 |
| 1966 | 969.26 | -18.94% | 380,000 | (30,266) | (31.23) | 392.05 | 308,031 | (259,945) | 567,977 |
| 1967 | 785.69 | 15.20% | 390,000 | 81,969 | 104.33 | 496.38 | 449,278 | (177,977) | 627,254 |
| 1968 | 905.11 | 4.27% | 400,000 | (49,278) | (54.44) | 441.94 | 417,076 | (227,254) | 644,330 |
| 1969 | 943.75 | -15.19% | 410,000 | (7,076) | (7.50) | 434.44 | 347,706 | (234,330) | 582,037 |
| 1970 | 800.36 | 4.82% | 420,000 | 72,294 | 90.33 | 524.76 | 440,235 | (162,037) | 602,271 |
| 1971 | 838.92 | 6.11% | 430,000 | (10,235) | (12.20) | 512.56 | 456,284 | (172,271) | 628,556 |
| 1972 | 890.20 | 14.58% | 440,000 | (16,284) | (18.29) | 494.27 | 504,166 | (188,556) | 692,722 |
| 1973 | 1,020.02 | -16.58% | 450,000 | (54,166) | (53.10) | 441.17 | 375,372 | (242,722) | 618,094 |
| 1974 | 850.86 | -27.57% | 460,000 | 84,628 | 99.46 | 540.63 | 333,158 | (158,094) | 491,252 |
| 1975 | 616.24 | 38.32% | 470,000 | 136,842 | 222.06 | 762.69 | 650,124 | (21,252) | 671,376 |
| 1976 | 852.41 | -17.86% | 480,000 | (170,124) | (199.58) | 563.11 | 565,728 | (191,376) | 757,104 |
| 1977 | 1,004.65 | -17.27% | 490,000 | (75,728) | (75.38) | 487.73 | 405,388 | (267,104) | 672,492 |
| 1978 | 831.17 | -3.15% | 500,000 | 94,612 | 113.83 | 601.56 | 484,263 | (172,492) | 656,755 |
| 1979 | 805.01 | 4.19% | 510,000 | 25,737 | 31.97 | 633.53 | 531,369 | (146,755) | 678,124 |
| 1980 | 838.74 | 14.93% | 520,000 | (11,369) | (13.55) | 619.98 | 597,652 | (158,124) | 755,776 |
| 1981 | 963.99 | -9.23% | 530,000 | (67,652) | (70.18) | 549.80 | 481,073 | (225,776) | 706,850 |
| 1982 | 875.00 | 19.60% | 540,000 | 58,927 | 67.34 | 617.14 | 645,865 | (166,850) | 812,715 |
| 1983 | 1,046.54 | 20.30% | 550,000 | (95,865) | (91.60) | 525.54 | 661,625 | (262,715) | 924,339 |
| 1984 | 1,258.94 | -3.76% | 560,000 | (101,625) | (80.72) | 444.82 | 538,929 | (364,339) | 903,268 |
| 1985 | 1,211.57 | 27.66% | 570,000 | 31,071 | 25.65 | 470.46 | 727,652 | (333,268) | 1,060,921 |
| 1986 | 1,546.67 | 22.58% | 580,000 | (147,652) | (95.46) | 375.00 | 710,980 | (480,921) | 1,191,901 |
| 1987 | 1,895.95 | 2.26% | 590,000 | (120,980) | (63.81) | 311.19 | 603,344 | (601,901) | 1,205,244 |
| 1988 | 1,938.83 | 11.85% | 600,000 | (3,344) | (1.72) | 309.46 | 671,096 | (605,244) | 1,276,341 |
| 1989 | 2,168.57 | 26.96% | 610,000 | (61,096) | (28.17) | 281.29 | 774,451 | (666,341) | 1,440,792 |
| 1990 | 2,753.20 | -4.34% | 620,000 | (154,451) | (56.10) | 225.19 | 593,080 | (820,792) | 1,413,873 |
| 1991 | 2,633.66 | 20.32% | 630,000 | 36,920 | 14.02 | 239.21 | 758,018 | (783,873) | 1,541,891 |
| 1992 | 3,168.83 | 4.17% | 640,000 | (118,018) | (37.24) | 201.97 | 666,716 | (901,891) | 1,568,607 |
| 1993 | 3,301.11 | 13.72% | 650,000 | (16,716) | (5.06) | 196.91 | 739,193 | (918,607) | 1,657,801 |
| 1994 | 3,754.09 | 2.14% | 660,000 | (79,193) | (21.10) | 175.8 | 674,126 | (997,801) | 1,671,927 |
| 1995 | 3,834.44 | 33.45% | 670,000 | (4,126) | (1.08) | 174.7 | 894,125 | (1,001,927) | 1,896,052 |
| 1996 | 5,117.12 | 26.01% | 680,000 | (214,125) | (41.84) | 132.8 | 856,893 | (1,216,052) | 2,072,945 |
| 1997 | 6,448.27 | 22.64% | 690,000 | (166,893) | (25.88) | 107.0 | 846,226 | (1,382,945) | 2,229,171 |
| 1998 | 7,908.25 | 16.10% | 700,000 | (146,226) | (18.49) | 88.5 | 812,696 | (1,529,171) | 2,341,867 |

FIG. 5b

| PAGE 1 | | | | SP500 | | | | | |
| --- | --- | --- | --- | --- | --- | --- | --- | --- | --- |
| INVESTSP | | | | | | | | | V.990223A |

| JAN OF EACH YEAR | OPENING PRICE PER SHARE | PERCENTAGE CHANGE FOR YEAR | BEGIN TARGET EQUITY BALANCE | INVESTMENT OR (REDEMPTION) | # OF SHARES PURCHASED OR (SOLD) | TOTAL # OF SHARES OWNED | END ACTUAL EQUITY BALANCE | END NET INVESTMENT TO DATE | END NET PROFIT OR (LOSS) TO DATE |
| --- | --- | --- | --- | --- | --- | --- | --- | --- | --- |
| 1929 | 24.86 | -12.67% | 10,000 | 10,000 | 402.25 | 402.25 | 8,733 | 10,000 | (1,267) |
| 1930 | 21.71 | -26.39% | 20,000 | 11,267 | 518.98 | 921.23 | 14,721 | 21,267 | (6,546) |
| 1931 | 15.98 | -48.06% | 30,000 | 15,279 | 956.11 | 1,877.35 | 15,582 | 36,546 | (20,964) |
| 1932 | 8.30 | -14.58% | 40,000 | 24,418 | 2,941.93 | 4,819.28 | 34,169 | 60,964 | (26,795) |
| 1933 | 7.09 | 48.66% | 50,000 | 15,831 | 2,232.91 | 7,052.19 | 74,330 | 76,795 | (2,465) |
| 1934 | 10.54 | -12.14% | 60,000 | (14,330) | (1,359.59) | 5,692.60 | 52,713 | 62,465 | (9,752) |
| 1935 | 9.26 | 48.60% | 70,000 | 17,287 | 1,866.80 | 7,559.40 | 104,017 | 79,752 | 24,266 |
| 1936 | 13.76 | 27.83% | 80,000 | (24,017) | (1,745.44) | 5,813.95 | 102,267 | 55,734 | 46,533 |
| 1937 | 17.59 | -35.70% | 90,000 | (12,267) | (697.41) | 5,116.54 | 57,868 | 43,467 | 14,401 |
| 1938 | 11.31 | 10.52% | 100,000 | 42,132 | 3,725.19 | 8,841.73 | 110,522 | 85,599 | 24,923 |
| 1939 | 12.50 | -1.60% | 110,000 | (522) | (41.73) | 8,800.00 | 108,240 | 85,077 | 23,163 |
| 1940 | 12.30 | -14.23% | 120,000 | 11,760 | 956.10 | 9,756.10 | 102,927 | 96,837 | 6,090 |
| 1941 | 10.55 | -15.36% | 130,000 | 27,073 | 2,566.18 | 12,322.27 | 110,038 | 123,910 | (13,872) |
| 1942 | 8.93 | 12.99% | 140,000 | 29,962 | 3,355.22 | 15,677.49 | 158,186 | 153,872 | 4,314 |
| 1943 | 10.09 | 17.44% | 150,000 | (8,186) | (811.29) | 14,866.20 | 176,165 | 145,686 | 30,478 |
| 1944 | 11.85 | 13.84% | 160,000 | (16,165) | (1,364.09) | 13,502.11 | 182,143 | 129,522 | 52,622 |
| 1945 | 13.49 | 33.58% | 170,000 | (12,143) | (900.18) | 12,601.93 | 227,087 | 117,378 | 109,708 |
| 1946 | 18.02 | -15.59% | 180,000 | (47,087) | (2,613.03) | 9,988.90 | 151,931 | 70,292 | 81,639 |
| 1947 | 15.21 | -2.50% | 190,000 | 38,069 | 2,502.88 | 12,491.78 | 185,253 | 108,361 | 76,893 |
| 1948 | 14.83 | 3.57% | 200,000 | 14,747 | 994.39 | 13,486.18 | 207,148 | 123,107 | 84,040 |
| 1949 | 15.36 | 9.90% | 210,000 | 2,852 | 185.70 | 13,671.88 | 230,781 | 125,960 | 104,821 |
| 1950 | 16.88 | 25.65% | 220,000 | (10,781) | (638.70) | 13,033.18 | 276,434 | 115,179 | 161,255 |
| 1951 | 21.21 | 14.05% | 230,000 | (46,434) | (2,189.23) | 10,843.94 | 262,315 | 68,745 | 193,570 |
| 1952 | 24.19 | 8.23% | 240,000 | (22,315) | (922.49) | 9,921.46 | 259,744 | 46,430 | 213,314 |
| 1953 | 26.18 | -2.75% | 250,000 | (9,744) | (372.18) | 9,549.27 | 243,125 | 36,686 | 206,438 |
| 1954 | 25.46 | 39.83% | 260,000 | 16,875 | 662.82 | 10,212.10 | 363,551 | 53,562 | 309,989 |
| 1955 | 35.60 | 24.02% | 270,000 | (93,551) | (2,627.83) | 7,584.27 | 334,846 | (39,989) | 374,834 |
| 1956 | 44.15 | 2.90% | 280,000 | (54,846) | (1,242.25) | 6,342.02 | 288,118 | (94,834) | 382,952 |
| 1957 | 45.43 | -9.49% | 290,000 | 1,882 | 41.43 | 6,383.45 | 262,487 | (92,952) | 355,440 |
| 1958 | 41.12 | 35.26% | 300,000 | 37,513 | 912.27 | 7,295.72 | 405,788 | (55,440) | 461,228 |
| 1959 | 55.62 | 4.33% | 310,000 | (95,788) | (1,722.19) | 5,573.53 | 323,432 | (151,228) | 474,660 |
| 1960 | 58.03 | 2.91% | 320,000 | (3,432) | (59.15) | 5,514.39 | 329,319 | (154,660) | 483,979 |
| 1961 | 59.72 | 15.66% | 330,000 | 681 | 11.40 | 5,525.79 | 381,666 | (153,979) | 535,645 |
| 1962 | 69.07 | -5.81% | 340,000 | (41,666) | (603.24) | 4,922.54 | 320,261 | (195,645) | 515,906 |
| 1963 | 65.06 | 17.51% | 350,000 | 29,739 | 457.11 | 5,379.65 | 411,274 | (165,906) | 577,180 |
| 1964 | 76.45 | 12.65% | 360,000 | (51,274) | (670.69) | 4,708.96 | 405,536 | (217,180) | 622,716 |

FIG. 6a

PAGE 2                                                     SP500

| JAN OF EACH YEAR | OPENING PRICE PER SHARE | PERCENTAGE CHANGE FOR YEAR | BEGIN TARGET EQUITY BALANCE | INVESTMENT OR (REDEMPTION) | # OF SHARES PURCHASED OR (SOLD) | TOTAL # OF SHARES OWNED | END ACTUAL EQUITY BALANCE | END NET INVESTMENT TO DATE | END NET PROFIT OR (LOSS) TO DATE |
|---|---|---|---|---|---|---|---|---|---|
| 1965 | 86.12 | 8.36% | 370,000 | (35,536) | (412.63) | 4,296.33 | 400,934 | (252,716) | 653,649 |
| 1966 | 93.32 | -9.50% | 380,000 | (20,934) | (224.32) | 4,072.01 | 343,881 | (273,649) | 617,530 |
| 1967 | 84.45 | 12.54% | 390,000 | 46,119 | 546.11 | 4,618.12 | 438,906 | (227,530) | 666,436 |
| 1968 | 95.04 | 7.37% | 400,000 | (38,906) | (409.36) | 4,208.75 | 429,461 | (266,436) | 695,898 |
| 1969 | 102.04 | -11.50% | 410,000 | (19,461) | (190.72) | 4,018.03 | 362,868 | (285,898) | 648,766 |
| 1970 | 90.31 | 3.52% | 420,000 | 57,132 | 632.62 | 4,650.65 | 434,789 | (228,766) | 663,555 |
| 1971 | 93.49 | 10.49% | 430,000 | (4,789) | (51.23) | 4,599.42 | 475,120 | (233,555) | 708,675 |
| 1972 | 103.30 | 14.64% | 440,000 | (35,120) | (339.98) | 4,259.44 | 504,403 | (268,675) | 773,078 |
| 1973 | 118.42 | -18.84% | 450,000 | (54,403) | (459.40) | 3,800.03 | 365,221 | (323,078) | 688,299 |
| 1974 | 96.11 | -24.50% | 460,000 | 94,779 | 986.15 | 4,786.18 | 347,285 | (228,299) | 575,585 |
| 1975 | 72.56 | 36.25% | 470,000 | 122,715 | 1,691.22 | 6,477.40 | 640,356 | (105,585) | 745,940 |
| 1976 | 98.86 | 5.01% | 480,000 | (160,356) | (1,622.05) | 4,855.35 | 504,034 | (265,940) | 769,974 |
| 1977 | 103.81 | -13.06% | 490,000 | (14,034) | (135.19) | 4,720.16 | 425,995 | (279,974) | 705,969 |
| 1978 | 90.25 | 10.48% | 500,000 | 74,005 | 820.00 | 5,540.17 | 552,410 | (205,969) | 758,379 |
| 1979 | 99.71 | 11.19% | 510,000 | (42,410) | (425.33) | 5,114.83 | 567,082 | (248,379) | 815,461 |
| 1980 | 110.87 | 19.93% | 520,000 | (47,082) | (424.66) | 4,690.18 | 623,653 | (295,461) | 919,113 |
| 1981 | 132.97 | -11.80% | 530,000 | (93,653) | (704.32) | 3,985.86 | 467,462 | (389,113) | 856,575 |
| 1982 | 117.28 | 23.01% | 540,000 | 72,538 | 618.50 | 4,604.37 | 664,272 | (316,575) | 980,847 |
| 1983 | 144.27 | 15.33% | 550,000 | (114,272) | (792.07) | 3,812.30 | 634,328 | (430,847) | 1,065,175 |
| 1984 | 166.39 | 3.14% | 560,000 | (74,328) | (446.71) | 3,365.59 | 577,568 | (505,175) | 1,082,743 |
| 1985 | 171.61 | 21.32% | 570,000 | (7,568) | (44.10) | 3,321.48 | 691,500 | (512,743) | 1,204,243 |
| 1986 | 208.19 | 27.05% | 580,000 | (111,500) | (535.57) | 2,785.92 | 736,903 | (624,243) | 1,361,146 |
| 1987 | 264.51 | -5.30% | 590,000 | (146,903) | (555.38) | 2,230.54 | 558,706 | (771,146) | 1,329,852 |
| 1988 | 250.48 | 13.95% | 600,000 | 41,294 | 164.86 | 2,395.40 | 683,671 | (729,852) | 1,413,523 |
| 1989 | 285.41 | 19.12% | 610,000 | (73,671) | (258.12) | 2,137.28 | 726,610 | (803,523) | 1,530,133 |
| 1990 | 339.97 | -4.26% | 620,000 | (106,610) | (313.59) | 1,823.69 | 593,611 | (910,133) | 1,503,744 |
| 1991 | 325.50 | 27.83% | 630,000 | 36,389 | 111.79 | 1,935.48 | 805,316 | (873,744) | 1,679,060 |
| 1992 | 416.08 | 4.60% | 640,000 | (165,316) | (397.32) | 1,538.17 | 669,456 | (1,039,060) | 1,708,516 |
| 1993 | 435.23 | 8.68% | 650,000 | (19,456) | (44.70) | 1,493.46 | 706,393 | (1,058,516) | 1,764,909 |
| 1994 | 472.99 | -1.64% | 660,000 | (46,393) | (98.08) | 1,395.38 | 649,200 | (1,104,909) | 1,754,109 |
| 1995 | 465.25 | 32.06% | 670,000 | 20,800 | 44.71 | 1,440.09 | 884,818 | (1,084,109) | 1,968,927 |
| 1996 | 614.42 | 24.71% | 680,000 | (204,818) | (333.35) | 1,106.73 | 848,002 | (1,288,927) | 2,136,929 |
| 1997 | 766.22 | 25.73% | 690,000 | (158,002) | (206.21) | 900.52 | 867,538 | (1,446,929) | 2,314,467 |
| 1998 | 963.37 | 27.60% | 700,000 | (167,538) | (173.91) | 726.62 | 893,178 | (1,614,467) | 2,507,646 |

FIG. 6b

ANNUAL INVESTMENT AMOUNT = 10,000
ASSUMPTION: DJIA YR 1929-1938 REPEATS EVERY 10 YEARS FOR 40 YEARS

| RUST YEAR | OPENING PRICE PER SHARE | BEGIN TARGET EQUITY BALANCE | INVESTMENT OR (REDEMPTION) | # OF SHARES PURCHASED OR (SOLD) | TOTAL # OF SHARES OWNED | END ACTUAL EQUITY BALANCE | NET INVESTMENT TO DATE | NET PROFIT TO DATE |
|---|---|---|---|---|---|---|---|---|
| 1 | 300.00 | 10,000 | 10,000 | 33.33 | 33.33 | 8,283 | 10,000 | (1,717) |
| 2 | 248.48 | 20,000 | 11,717 | 47.16 | 80.49 | 13,247 | 21,717 | (8,470) |
| 3 | 164.58 | 30,000 | 16,753 | 101.79 | 182.28 | 14,200 | 38,470 | (24,271) |
| 4 | 77.90 | 40,000 | 25,800 | 331.20 | 513.48 | 30,773 | 64,271 | (33,498) |
| 5 | 59.93 | 50,000 | 19,227 | 320.83 | 834.31 | 83,347 | 83,498 | (151) |
| 6 | 99.90 | 60,000 | (23,347) | (233.71) | 600.60 | 62,486 | 60,151 | 2,336 |
| 7 | 104.04 | 70,000 | 7,514 | 72.22 | 672.82 | 96,973 | 67,664 | 29,309 |
| 8 | 144.13 | 80,000 | (16,973) | (117.76) | 555.05 | 99,854 | 50,691 | 49,163 |
| 9 | 179.90 | 90,000 | (9,854) | (54.78) | 500.28 | 60,459 | 40,837 | 19,622 |
| 10 | 120.85 | 100,000 | 39,541 | 327.19 | 827.47 | 248,242 | 80,378 | 167,864 |
| 11 | 300.00 | 110,000 | (138,242) | (460.81) | 366.67 | 91,109 | (57,864) | 148,973 |
| 12 | 248.48 | 120,000 | 28,891 | 116.27 | 482.94 | 79,482 | (28,973) | 108,455 |
| 13 | 164.58 | 130,000 | 50,518 | 306.95 | 789.89 | 61,532 | 21,545 | 39,987 |
| 14 | 77.90 | 140,000 | 78,468 | 1,007.29 | 1,797.18 | 107,705 | 100,013 | 7,692 |
| 15 | 59.93 | 150,000 | 42,295 | 705.74 | 2,502.92 | 250,042 | 142,308 | 107,734 |
| 16 | 99.90 | 160,000 | (90,042) | (901.32) | 1,601.60 | 166,631 | 52,266 | 114,364 |
| 17 | 104.04 | 170,000 | 3,369 | 32.39 | 1,633.99 | 235,507 | 55,636 | 179,871 |
| 18 | 144.13 | 180,000 | (55,507) | (385.11) | 1,248.87 | 224,672 | 129 | 224,543 |
| 19 | 179.90 | 190,000 | (34,672) | (192.73) | 1,056.14 | 127,635 | (34,543) | 162,178 |
| 20 | 120.85 | 200,000 | 72,365 | 598.80 | 1,654.94 | 496,483 | 37,822 | 458,661 |
| 21 | 300.00 | 210,000 | (286,483) | (954.94) | 700.00 | 173,936 | (248,661) | 422,597 |
| 22 | 248.48 | 220,000 | 46,064 | 185.38 | 885.38 | 145,716 | (202,597) | 348,313 |
| 23 | 164.58 | 230,000 | 84,284 | 512.11 | 1,397.50 | 108,865 | (118,313) | 227,178 |
| 24 | 77.90 | 240,000 | 131,135 | 1,683.38 | 3,080.87 | 184,637 | 12,822 | 171,815 |
| 25 | 59.93 | 250,000 | 65,363 | 1,090.66 | 4,171.53 | 416,736 | 78,185 | 338,551 |
| 26 | 99.90 | 260,000 | (156,736) | (1,568.93) | 2,602.60 | 270,775 | (78,551) | 349,326 |
| 27 | 104.04 | 270,000 | (775) | (7.45) | 2,595.16 | 374,040 | (79,326) | 453,366 |
| 28 | 144.13 | 280,000 | (94,040) | (652.47) | 1,942.69 | 349,490 | (173,366) | 522,856 |
| 29 | 179.90 | 290,000 | (59,490) | (330.68) | 1,612.01 | 194,811 | (232,856) | 427,667 |
| 30 | 120.85 | 300,000 | 105,189 | 870.41 | 2,482.42 | 744,725 | (127,667) | 872,392 |
| 31 | 300.00 | 310,000 | (434,725) | (1,449.08) | 1,033.33 | 256,763 | (562,392) | 819,154 |
| 32 | 248.48 | 320,000 | 63,237 | 254.50 | 1,287.83 | 211,951 | (499,154) | 711,105 |
| 33 | 164.58 | 330,000 | 118,049 | 717.27 | 2,005.10 | 156,198 | (381,105) | 537,303 |
| 34 | 77.90 | 340,000 | 183,802 | 2,359.47 | 4,364.57 | 261,569 | (197,303) | 458,872 |
| 35 | 59.93 | 350,000 | 88,431 | 1,475.58 | 5,840.15 | 583,431 | (108,872) | 692,302 |
| 36 | 99.90 | 360,000 | 223,431 | (2,236.54) | 3,603.60 | 374,919 | (332,302) | 707,221 |
| 37 | 104.04 | 370,000 | (4,919) | (47.28) | 3,556.32 | 512,573 | (337,221) | 849,794 |
| 38 | 144.13 | 380,000 | 132,573) | (919.82) | 2,636.51 | 474,308 | (469,794) | 944,102 |
| 39 | 179.90 | 390,000 | (84,308) | (468.64) | 2,167.87 | 261,987 | (554,102) | 816,089 |
| 40 | 120.85 | 400,000 | 138,013 | 1,142.02 | 3,309.89 | 992,966 | (416,089) | 1,409,056 |

11.55%  FIG. 7

ANNUAL INVESTMENT AMOUNT = 10,000
ASSUMPTION: DJIA YR 1929-1938 FOR 10 YEARS THE REVERSES FOR NEXT 10 YEARS, ETC.

| RUST YEAR | OPENING PRICE PER SHARE | BEGIN TARGET EQUITY BALANCE | INVESTMENT OR (REDEMPTION) | # OF SHARES PURCHASED OR (SOLD) | TOTAL # OF SHARES OWNED | END ACTUAL EQUITY BALANCE | NET INVESTMENT TO DATE | NET PROFIT TO DATE |
|---|---|---|---|---|---|---|---|---|
| 1 | 300.00 | 10,000 | 10,000 | 33.33 | 33.33 | 8,283 | 10,000 | (1,717) |
| 2 | 248.48 | 20,000 | 11,717 | 47.16 | 80.49 | 13,247 | 21,717 | (8,470) |
| 3 | 164.58 | 30,000 | 16,753 | 101.79 | 182.28 | 14,200 | 38,470 | (24,271) |
| 4 | 77.90 | 40,000 | 25,800 | 331.20 | 513.48 | 30,773 | 64,271 | (33,498) |
| 5 | 59.93 | 50,000 | 19,227 | 320.83 | 834.31 | 83,347 | 83,498 | (151) |
| 6 | 99.90 | 60,000 | (23,347) | (233.71) | 600.60 | 62,486 | 60,151 | 2,336 |
| 7 | 104.04 | 70,000 | 7,514 | 72.22 | 672.82 | 96,973 | 67,664 | 29,309 |
| 8 | 144.13 | 80,000 | (16,973) | (117.76) | 555.05 | 99,854 | 50,691 | 49,163 |
| 9 | 179.90 | 90,000 | (9,854) | (54.78) | 500.28 | 60,459 | 40,837 | 19,622 |
| 10 | 120.85 | 100,000 | 39,541 | 327.19 | 827.47 | 100,000 | 80,378 | 19,622 |
| 11 | 120.85 | 110,000 | 10,000 | 82.75 | 910.22 | 163,748 | 90,378 | 73,371 |
| 12 | 179.90 | 120,000 | (43,748) | (243.18) | 667.04 | 96,140 | 46,629 | 49,511 |
| 13 | 144.13 | 130,000 | 33,860 | 234.93 | 901.96 | 93,840 | 80,489 | 13,351 |
| 14 | 104.04 | 140,000 | 46,160 | 443.67 | 1,345.64 | 134,429 | 126,649 | 7,780 |
| 15 | 99.90 | 150,000 | 15,571 | 155.87 | 1,501.50 | 89,985 | 142,220 | (52,235) |
| 16 | 59.93 | 160,000 | 70,015 | 1,168.28 | 2,669.78 | 207,976 | 212,235 | (4,259) |
| 17 | 77.90 | 170,000 | (37,976) | (487.50) | 2,182.28 | 359,160 | 174,259 | 184,901 |
| 18 | 164.58 | 180,000 | (179,160) | (1,088.59) | 1,093.69 | 271,761 | (4,901) | 276,662 |
| 19 | 248.48 | 190,000 | (81,761) | (329.04) | 764.65 | 229,395 | (86,662) | 316,057 |
| 20 | 300.00 | 200,000 | (29,395) | (97.98) | 666.67 | 200,000 | (116,057) | 316,057 |
| 21 | 300.00 | 210,000 | 10,000 | 33.33 | 700.00 | 173,936 | (106,057) | 279,993 |
| 22 | 248.48 | 220,000 | 46,064 | 185.38 | 885.38 | 145,716 | (59,993) | 205,709 |
| 23 | 164.58 | 230,000 | 84,284 | 512.11 | 1,397.50 | 108,865 | 24,291 | 84,574 |
| 24 | 77.90 | 240,000 | 131,135 | 1,683.38 | 3,080.87 | 184,637 | 155,426 | 29,211 |
| 25 | 59.93 | 250,000 | 65,363 | 1,090.66 | 4,171.53 | 416,736 | 220,789 | 195,947 |
| 26 | 99.90 | 260,000 | (156,736) | (1,568.93) | 2,602.60 | 270,775 | 64,053 | 206,722 |
| 27 | 104.04 | 270,000 | (775) | (7.45) | 2,595.16 | 374,040 | 63,278 | 310,762 |
| 28 | 144.13 | 280,000 | (94,040) | (652.47) | 1,942.69 | 349,490 | (30,762) | 380,252 |
| 29 | 179.90 | 290,000 | (59,490) | (330.68) | 1,612.01 | 194,811 | (90,252) | 285,063 |
| 30 | 120.85 | 300,000 | 105,189 | 870.41 | 2,482.42 | 300,000 | 14,937 | 285,063 |
| 31 | 120.85 | 310,000 | 10,000 | 82.75 | 2,565.16 | 461,473 | 24,937 | 436,536 |
| 32 | 179.90 | 320,000 | (141,473) | (786.40) | 1,778.77 | 256,374 | 116,536) | 372,909 |
| 33 | 144.13 | 330,000 | 73,626 | 510.83 | 2,289.60 | 238,210 | (42,909) | 281,119 |
| 34 | 104.04 | 340,000 | 101,790 | 978.37 | 3,267.97 | 326,471 | 58,881 | 267,590 |
| 35 | 99.90 | 350,000 | 23,529 | 235.53 | 3,503.50 | 209,965 | 82,410 | 127,555 |
| 36 | 59.93 | 360,000 | 150,035 | 2,503.50 | 6,007.01 | 467,946 | 232,445 | 235,501 |
| 37 | 77.90 | 370,000 | (97,946) | (1,257.33) | 4,749.68 | 781,702 | 134,499 | 647,203 |
| 38 | 164.58 | 380,000 | (401,702) | (2,440.77) | 2,308.91 | 573,717 | 267,203) | 840,920 |
| 39 | 248.48 | 390,000 | (183,717) | (739.36) | 1,569.54 | 470,863 | 450,920) | 921,783 |
| 40 | 300.00 | 400,000 | (70,863) | (236.21) | 1,333.33 | 400,000 | 521,783) | 921,783 |

INVESTMB  
V. 990303

| YEAR | OPENING PRICE PER SHARE | BEGIN TARGET EQUITY BALANCE | INVESTMENT OR REDEMPTION | # OF SHARES PURCHASED OR SOLD | TOTAL # OF SHARES OWNED | END ACTUAL EQUITY BALANCE | END NET INVESTMENT TO DATE | END NET ASSET PROFIT TO DATE | % INCOME RETURN FOR YEAR | CASH INCOME RETURN FOR YEAR | END NET INCOME TO DATE |
|---|---|---|---|---|---|---|---|---|---|---|---|
| 1979 | 10.00 | 10,000 | 10,000 | 1,000.00 | 1,000.00 | 9,120 | 10,000 | (880) | 5.80% | 528.96 | 528.96 |
| 1980 | 9.12 | 20,000 | 10,880 | 1,088.00 | 2,088.00 | 14,739 | 20,880 | (6,141) | 6.60% | 972.77 | 1,501.73 |
| 1981 | 7.06 | 30,000 | 15,261 | 1,673.36 | 3,761.36 | 21,241 | 36,141 | (14,900) | 8.80% | 1,869.19 | 3,37( |
| 1982 | 5.65 | 40,000 | 18,759 | 2,657.53 | 6,418.89 | 45,310 | 54,900 | (9,590) | 13.60% | 6,162.19 | 9,533.11 |
| 1983 | 7.06 | 50,000 | 4,690 | 830.48 | 7,249.37 | 51,275 | 59,590 | (8,315) | 9.30% | 4,768.56 | 14,301.66 |
| 1984 | 7.07 | 60,000 | 8,725 | 1,236.06 | 8,485.43 | 59,237 | 68,315 | (9,078) | 9.90% | 5,864.49 | 20,166.15 |
| 1985 | 6.98 | 70,000 | 10,763 | 1,521.67 | 10,007.10 | 77,335 | 79,078 | (1,743) | 10.10% | 7,810.85 | 27,977.00 |
| 1986 | 7.73 | 80,000 | 2,665 | 381.73 | 10,388.84 | 88,795 | 81,743 | 7,052 | 8.80% | 7,813.99 | 35,790.99 |
| 1987 | 8.55 | 90,000 | 1,205 | 155.88 | 10,544.71 | 82,647 | 82,948 | (300) | 7.20% | 5,950.59 | 41,741.58 |
| 1988 | 7.84 | 100,000 | 17,353 | 2,030.25 | 12,574.96 | 102,896 | 100,300 | 2,596 | 7.80% | 8,025.91 | 49,767.49 |
| 1989 | 8.18 | 110,000 | 7,104 | 906.34 | 13,481.30 | 114,504 | 107,404 | 7,100 | 7.70% | 8,816.84 | 58,584.33 |
| 1990 | 8.49 | 120,000 | 5,496 | 671.61 | 14,152.91 | 119,728 | 112,900 | 6,828 | 7.20% | 8,620.42 | 67,204.75 |
| 1991 | 8.46 | 130,000 | 10,272 | 1,209.38 | 15,362.30 | 137,626 | 123,172 | 14,455 | 7.60% | 10,459.61 | 77,664.36 |
| 1992 | 8.96 | 140,000 | 2,374 | 280.57 | 15,642.87 | 143,784 | 125,545 | 18,238 | 6.70% | 9,633.51 | 87,297.87 |
| 1993 | 9.19 | 150,000 | 6,216 | 693.89 | 16,336.75 | 161,123 | 131,762 | 29,362 | 6.20% | 9,989.85 | 97,287.52 |
| 1994 | 9.86 | 160,000 | (1,123) | (122.22) | 16,214.53 | 142,167 | 130,638 | 11,529 | 5.40% | 7,877.02 | 104,964.54 |
| 1995 | 8.77 | 170,000 | 27,833 | 2,822.06 | 19,036.58 | 167,274 | 158,471 | 26,803 | 6.50% | 12,172.79 | 117,137.3? |
| 1996 | 9.84 | 180,000 | (7,274) | (829.58) | 18,207.01 | 177,142 | 151,197 | 25,945 | 5.50% | 9,742.83 | 126,880. |
| 1997 | 9.73 | 190,000 | 12,858 | 1,306.99 | 19,514.00 | 196,693 | 164,055 | 32,638 | 5.70% | 11,211.53 | 138,091.69 |
| 1998 | 10.08 | 200,000 | 3,307 | 339.85 | 19,853.85 | 201,720 | 167,362 | 34,358 | 5.20% | 10,489.44 | 148,581.13 |
| AVERAGES = | | | | | | | $8,368.08 | | 7.58% | 7,429.06 | |

$8,368.08 AVERAGE ANNUAL INVESTMENT  
$7,429.06 AVERAGE ANNUAL INCOME $939.02 NET ANNUAL INVESTMENT IN EQUITY 21.157% AVERAGE RATE OF RETURN ON EQUITY INVESTMENT

FIG. 12

AUTOMATED TARGETED AND PROPORTIONAL INVESTMENT MANAGEMENT SYSTEMS AND METHODS

I. RELATED APPLICATIONS

This application claims priority from provisional application, Ser. No. 60/123,714, filed Mar. 10, 1999.

II. BACKGROUND OF THE INVENTION

This invention relates generally to an automated system for investment management and more specifically to a computerized system for managing the investment of capital in markets to receive income and capital gains while minimizing the risk of loss of net asset value.

Any form of investment implicates the "risk/reward ratio," which represents the relationship between the possibilities of profit (reward) and the concomitant possibilities for loss (risk). An investor's ability to withstand risk usually depends on the person's overall economic position and economic needs, which in turn sets the amount of reward. The only way to increase the reward for a given risk is to change the ratio. Doing so, however, has proven difficult.

The most direct way to increase reward is to buy low and sell high, but following this simple and elegant rule has proven difficult because it requires predictive powers. It is not possible to know whether the market was at a high or low until well after the point in time passes.

In addition, human emotion enters into and complicates investment decisions. For example, when a stock's price falls, many investors want to keep the stock hoping to break even or win when the stock's price recovers. Similarly, when a stock's price rises, many investors choose to hold the stock out of fear of selling below the best price. Both decisions are seldom wise in the long run.

A sound investment strategy should remove emotion from decision-making, but most investment strategies lack any plan to indicate when to buy and when to sell. Some investment models explain when to buy, but not when to sell. For example, a portfolio manager may place a sell order at a specific price, but the manager generally lacks any quantitative means to determine the selling price. That value depends as much on guesswork as it does on science.

Many financial planners also recommend "asset allocation models," such as 60% equities, 30% fixed income obligations, and 10% cash or money-market type funds. The problem remains, however, when to liquidate and when to purchase assets. Moreover, mere asset allocation does not include systematic profit taking, only systematic investment to maintain the proper ratios.

III. SUMMARY OF THE INVENTION

A method, consistent with this invention and executed by a data processing system, for controlling an investment vehicle comprises determining the value of the investment vehicle; comparing the determined value against a predefined investment target; making an additional investment in the investment vehicle automatically if the value fails to reach the investment target, the amount of the additional investment depending upon the amount by which the value fails to reach the investment target; and liquidating part of the investment vehicle automatically if the value exceeds the investment target, the part of the investment vehicle that is liquidated depending upon the amount by which the value exceeds the investment target.

IV. BRIEF DESCRIPTION OF THE DRAWINGS

The accompanying drawings, which are incorporated in and constitute a part of this specification, illustrate an embodiment of the invention and, together with the description, serve to explain the advantages and principles of the invention.

In the drawings:

FIGS. 5A and 5B are a spreadsheet of calculations of an example of a procedure consistent with this invention;

FIGS. 6A and 6B are another spreadsheet of calculations of an example of a procedure consistent with this invention;

FIG. 7 is yet another spreadsheet of calculations of an example of a procedure consistent with this invention;

FIG. 8 is still another spreadsheet of calculations of an example of a procedure consistent with this invention;

FIG. 12 is still another spreadsheet of calculations of an example of a procedure consistent with this invention.

V. DESCRIPTION OF THE PREFERRED EMBODIMENTS

A. Overview

Reference will now be made in detail to implementations, consistent with the present invention, that are illustrated in the accompanying drawings. Wherever possible, the same reference numbers will be used throughout the drawings and the following description to refer to the same or like parts.

Systems and methods consistent with this invention seek to apply a predefined, and preferably proportional, response to the motion of particular equity investments (e.g., stocks, bonds, mutual funds) that are, by their nature, nonlinear and inherently unstable. Such systems and methods do so using targets and prescribed responses that require additional investment when the equity price drops below the predefined target, and liquidation when the equity price exceeds the target.

Figure 1:
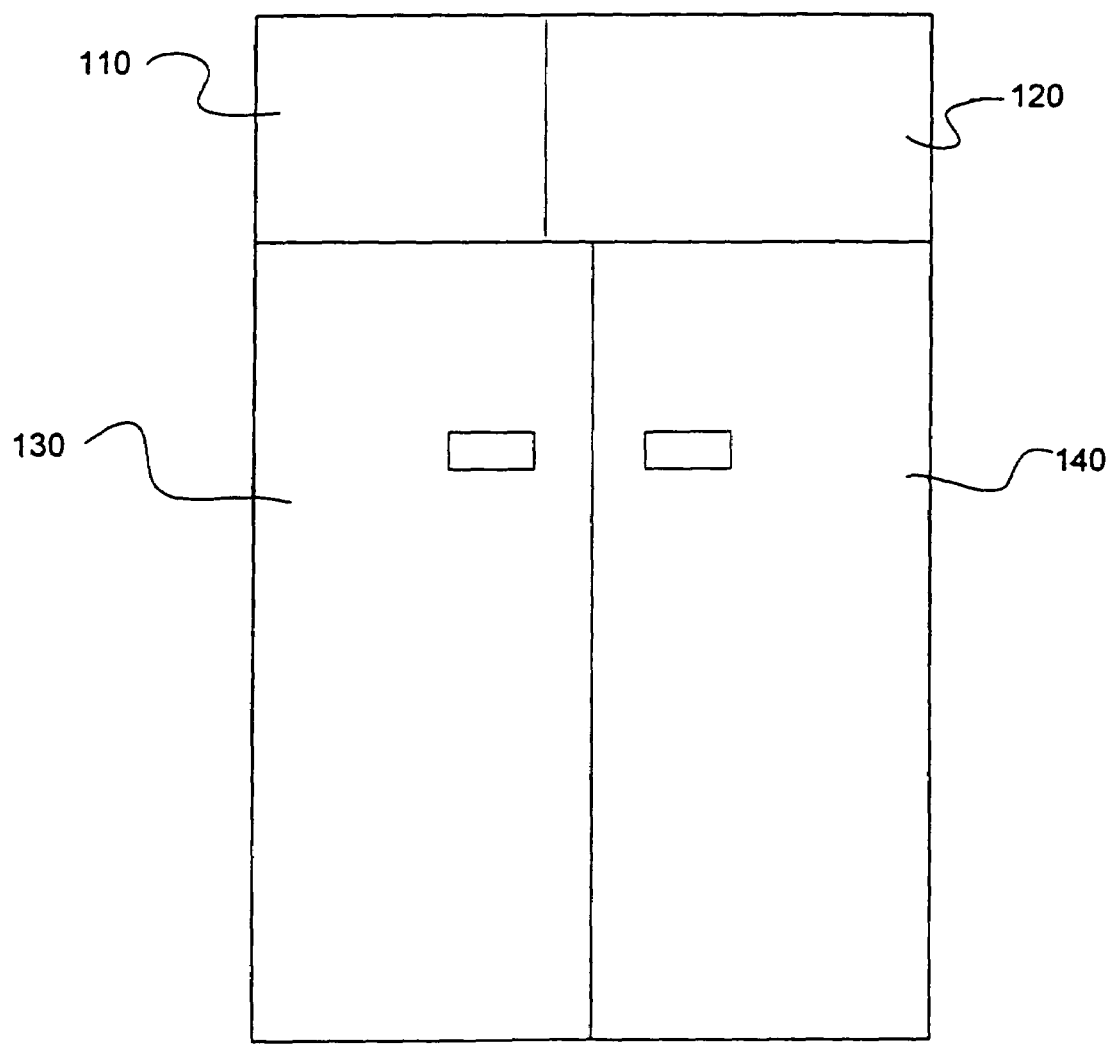
FIG. 1 is a block diagram of a computer system consistent with this invention.

FIG. 1 shows a computer system 100 consistent with the invention. Computer system 100 includes a processor 110 and a memory 120 for executing the procedures described below. Auxiliary storage 130 can store the needed programs as well as the data for the different equities. Input/output ports 140 allow computer system 100 to determine, automatically, the prices of the different equities and to communicate with investors.

B. Procedures

Figure 2:
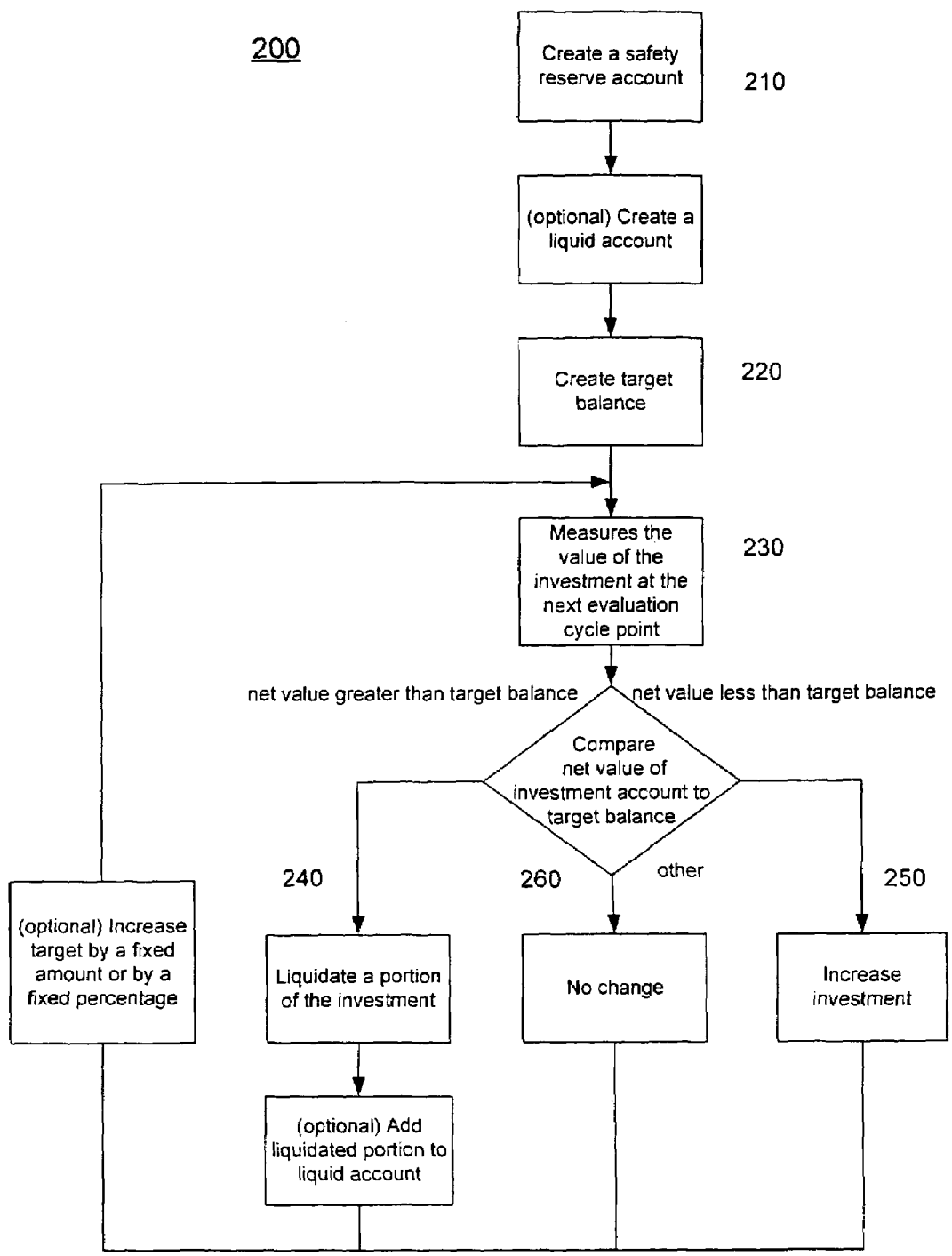
FIG. 2 is a flow diagram of a procedure consistent with the invention.

FIG. 2 shows an example of a procedure 200 consistent with the invention for investment management. The procedure begins with the creation of a safety reserve account (Step 210). This requires, in the preferred embodiment, determining a reserve ratio that represents the relationship between the total amount of principal to be used and the annual target balance (defined below) to be invested. A conservative value is 20:1, but a more aggressive investor with a higher risk tolerance may drop that ratio to 10:1.

The reserve account could be kept in some type of money-market instruments or short-term bond funds, such as treasury or municipal bonds. Investments into the equity account preferably come from the reserve account, while profits taken from the equity account would return to the reserve account.

Next, a "target balance" is created to compare to the equity value (Step 220). Systems and methods consistent with this invention preferably use a "linear function" to create the target balance. There are several different ways to create this target balance, the simplest being to start with a target amount of a set number of dollars (i.e., $10,000.00), and increment the target by that set number of dollars for each succeeding year (for example, leaving a target balance of $20,000.00 at the end of the second year, $30,000.00 at the end of the third year, $40,000.00 at the end of the fourth year, etc.). Using a $10,000.00 target with maximum safety (i.e., a reserve ratio of 20:1), would require a reserve of $200,000.00. Other methods of creating a target balance are also acceptable.

A computer system then measures the value of the investment at an evaluation cycle point (Step 230). The evaluation cycle point defines the period (e.g., monthly, yearly, etc.) at which the investment decision is evaluated. The investment could be timed so that the cycles occur at any desired period, for example, annually, semiannually, quarterly, monthly, weekly or even daily. The only difference is between any of these models would be the frequency of measurement and purchase.

Next, the computer system automatically compares the net value of the investment account to the target balance (Step 240). If the net value exceeds the target balance by more than a predetermined amount, the computer system liquidates a portion of the investment (Step 250), preferably into the reserve account and preferably in proportion to the amount that the equity value exceeds the target. Hence, when the market or price hits its top, the system will have taken the maximum liquidation.

Similarly, when the equity value falls below the target balance by more than the predetermined amount, the computer system forces an investment (Step 260), preferably from the reserve account and preferably in proportion to the amount that the equity balance falls below the target. Hence, at the point that the price has dropped to its lowest value, this system would force a maximum investment, even though the investor may not know that it has dropped to that value.

If neither condition exists, no investment or liquidation occurs (Step 270). After whatever action is taken, the system then waits for the next evaluation cycle point.

Between the two extremes, the investment or liquidation will be dictated by a relationship, preferably linear, between the equity value and the linear target for the same point in time. In a rising marketplace, the size of investment will decrease proportionately with the rise in the market until the target balance and the equity value are equal, at which point the investment will then be zero. If the equity value continues to rise, then investment stops and liquidation begins, with maximum liquidation at the high point for the cycle.

As the value of the equity begins to decline relative to the target, the liquidations decrease until a balance point where the target balance and the equity value are equal. At the balance point, no action takes place. As the price declines further, purchase of additional equity begins, with the amount of the purchase increasing in proportion to the price drops. The low point in the cycle forces a maximum purchase.

All that is required is that at the end of the cycle, in our example, the end of the year, the account value can be determined and compared to the target. This simple comparison removes all decision making and analysis from the process.

Generally, the determinations forming the basis for the systems and methods consistent with this invention can be understood according to the following relationships: Thus, for a fixed increment,

| (YEAR 1) | $T_x = T_1$ |
|---|---|
| (YEAR 2+) | $T_x = T_f + T_{x-1} = T_1 + (x-1) T_f$ |

For a percentage increase,

| (YEAR 1) | $T_x = T_1$ |
|---|---|
| (YEAR 2+) | $T_x = T_1 \times (1 + I)^{(x-1)}$ |

Alternatively,

| (YEAR 1) | $T_x = T_1$ |
|---|---|
| (YEAR 2+) | $T_x = T_{x-1} + (T_f + T_f \times (1 + I)^x)$ | where
- $x$=subscript for plan year
- $P_x$=Price per share at the beginning of the year ($_x$)
- $T_i$=fixed amount of initial investment target
- $T_f$=fixed amount of annual investment target
- $I$=annual percentage increment over prior Target Value
- M Margin of safety factor
- R=Safety reserve
- $A_x$=Investment or Redemption on first day of year ($_x$)
- $S_x$=Number of shares purchased or sold on first day of year ($_x$)
- $Z_x$=Total number of shares held at the end of year ($_x$)
- $E_x$=Equity account value on last day of the prior year ($_x$)
- $T_x$=Target equity value (fixed increment) at the beginning of the year (x)

C. Examples

Figure 3:
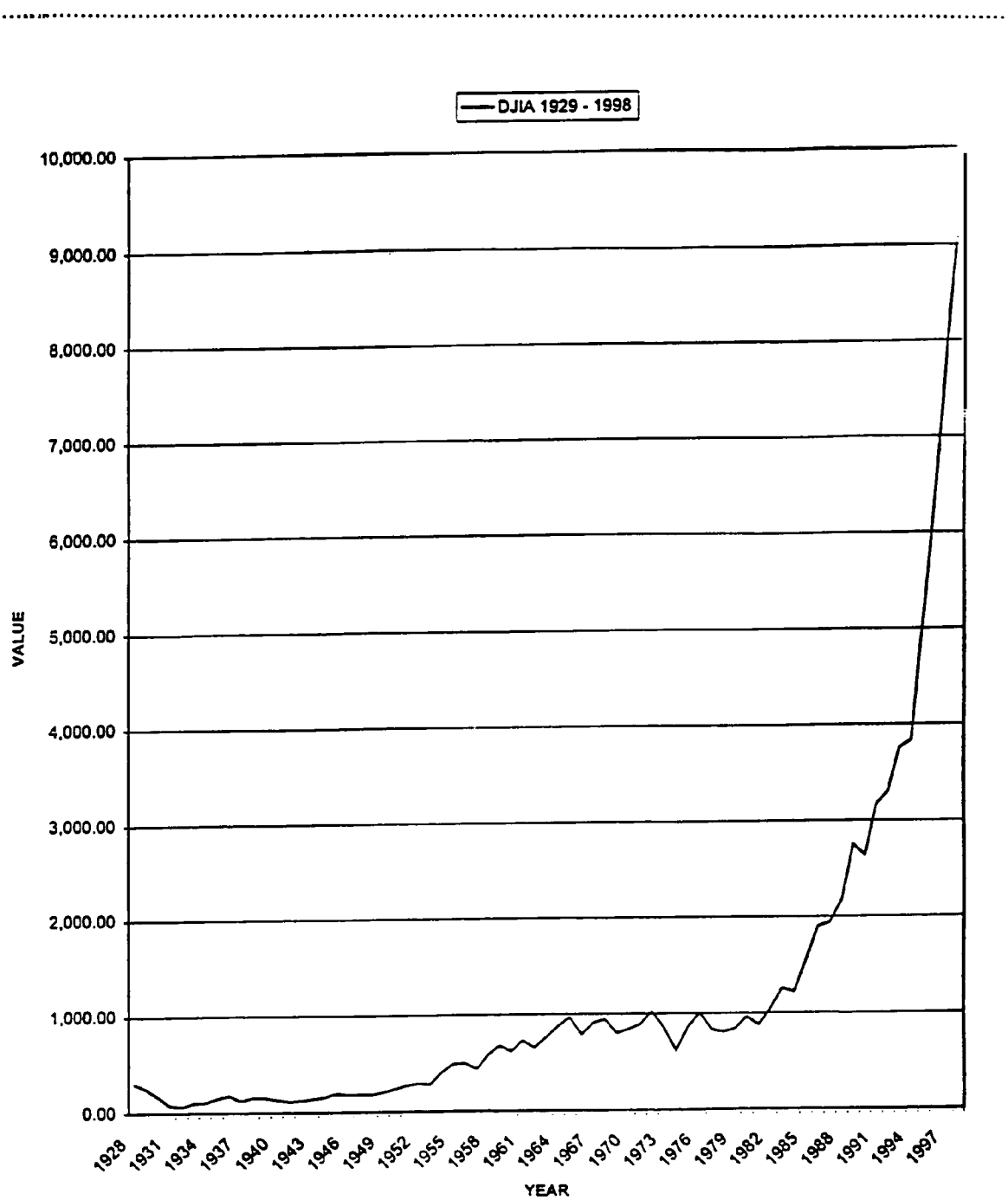
FIG. 3 is a table of values for an example of a procedure consistent with this invention.

A method consistent with this invention was applied to the greatest market plunge in history to test its efficacy. Graph 300 in FIG. 3 shows the opening price of the Dow Jones Industrial Average starting the first trading day of 1929 and ending with the first trading day of 1999 (or, equivalently, the close on the last trading day of 1998).

Figure 4:
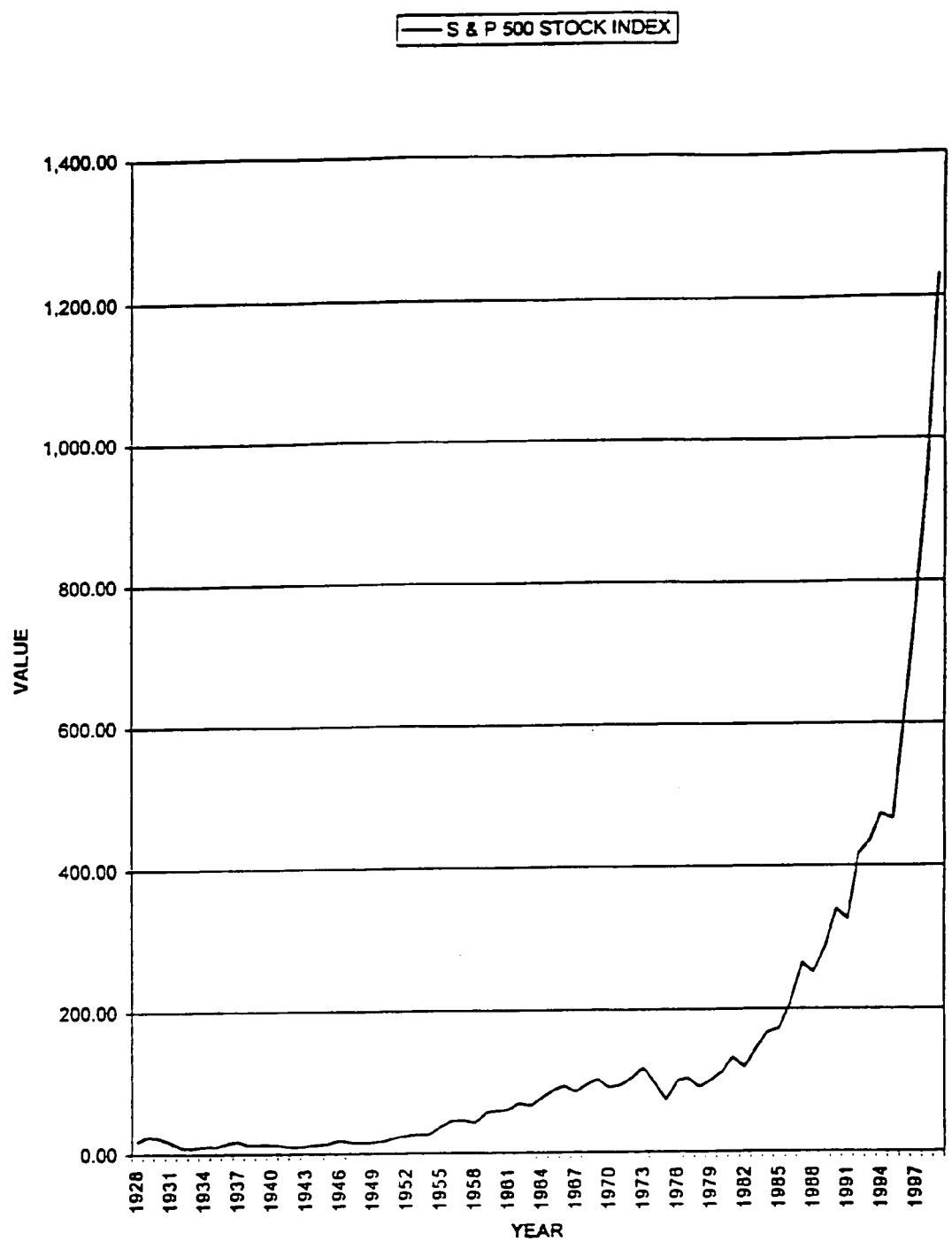
FIG. 4 is another table of values for an example of a procedure consistent with this invention.

Graph 400 in FIG. 4, entitled "Standard and Poor's 500 Stock Index," provides the exact same data for that index. FIGS. 5A and 5B contain a spreadsheet 500 entitled "INVESTDJ." This spreadsheet presumes that a $10,000.00 per year target with a $200,000.00 reserve and the first investment was made the first trading day of 1929, little more than ten months before the "great crash."

For purposes of this illustration, Dow Jones Industrial Average is considered as a security to illustrate overall market movement. Because the crash of 1929 led to more than an 80% decline in value in a four-year period, it was an inopportune time to invest money. Nonetheless, assuming $300.00 a share for a target balance for $10,000.00 resulted in purchase of 33⅓ shares. Those shares suffered a 17.17% loss of equity during that year resulting in an account actual equity balance of $8,283.00.

Meeting the target balance of $20,000.00 required an investment of $11,717.00 at the first trading day of 1930. In other words, the system forced a greater investment as the market price declined. Investing $11,717.00 required a purchase of 47.16 shares due to the drop in the share price. Thus in 1930, the model would have had 80.49 shares (33.33 original shares and 47.16 additional shares), which would have yielded an end actual equity balance of $13,247.00 at the end of 1930. The net investment at that time was $21,717.00 ($10,000.00 initial plus $11,717.00 additional), which meant that the portfolio suffered a loss for the two years of $8,470.00.

At the beginning of the third year, the target balance became $30,000.00. Subtracting the actual equity balance of $13,247.00 from the target of $30,000.00 yields $16,753.00 for the required investment. Dividing this investment by the $164.58 price per share meant a purchase of an additional 101.79 shares, bringing the total shares held to 182.28.

The equity at the end of the third year equals 182.28 shares times $77.90 per share, or $14,200.00. Subtracting that value from the target balance of $40,000.00 yields a need for an additional investment of $25,800.00, which purchases 331.20 additional shares. At this point, the portfolio has 513.48 shares.

At the end of the fourth year, the equity balance has fallen again to $30,773.00. Because the target balance is now $50,000.00, an investment of $19,227.00, or 320.83 shares, is required. The portfolio now has 834.31 shares.

At the end of the fifth year, however, the equity balance has risen dramatically to $83,347.00. This rise in the stock price has meant that the equity now exceeds the $60,000.00 target by $23,347.00, requiring liquidation of that amount (233.71 shares). This, in turn, reduces the total number of shares owned to 600.60.

The equity balance at the end of year six would be 600.60 shares×$104.04 per share, yielding an equity balance of $62,486.00. Because the target has now moved to $70,000.00, an additional $7,514.00, or 72.22 shares, must be invested, raising the number of shares in the portfolio to 672.82 shares.

At the end of year seven the equity balance is 672.82 shares×$144.13 per share, or $96,973.00, which is $16,973.00 greater than the target balance is $80,000.00. Liquidating $16,973.00 reduces the portfolio by 117.76 shares to only 555.05 shares. The remainder of Table 300 demonstrates how the methodology results in an average net investment gain of 6.94%.

FIGS. 6A and 6B show a spreadsheet 600 for values shown in Table 300, except the data used is the opening value of the Standard and Poor's 500 Stock Index from the first trading day of 1929 to the first trading day of 1999 which, in fact, is the closing value of the last trading day of 1998. The methodology and explanation of this table parallels that of Table 300.

FIG. 7 shows a spreadsheet 700 based on hypothetical data from 1929 through 1938, using the Standard and Poors 500 Stock Index. This data represents the stock market indicator for the worst market crash in history and the following ten-year depression. The following decades assumed repeated duplications of this ten-year economic fiasco. Therefore, this forty-year illustration assumes an economy that has been in depression for forty years as well with a major stock market crash every decade. Using the methodology described above, the results are again favorable, with an annual net investment gain of 11.55%. Admittedly, one possible flaw in this methodology is that every time we start a new cycle, we are jumping from $120.85 a share to $300.00 a share and the $300.00 a share determines the account value at the end of the fortieth.

To offset this anomaly, the model in spreadsheet 800 of FIG. 8 assumes the Dow Jones Industrial Average from 1929 through 1938, but reverses it for the next decade, then reverses it again for the third decade, and finally reverses it again for the fourth decade. Thus, in decades one and three, the numbers are identical, and in decades two and four, the numbers are identical. This also creates a longer, more broadly-based movement in the market, although there are two years of stable market conditions at each of the decade break points.

Applying the method consistent with this invention to these models shows, by the column entitled "Net Investment to Date" that the largest value occurs in year 36 at an amount of $232,445.00. This would teach that if the market had behaved in this manner, we would need a ratio of 23.2445:1. This anomaly, however, has never occurred, and if did, our national economy would have crashed long before the 40th year.

Figure 9:
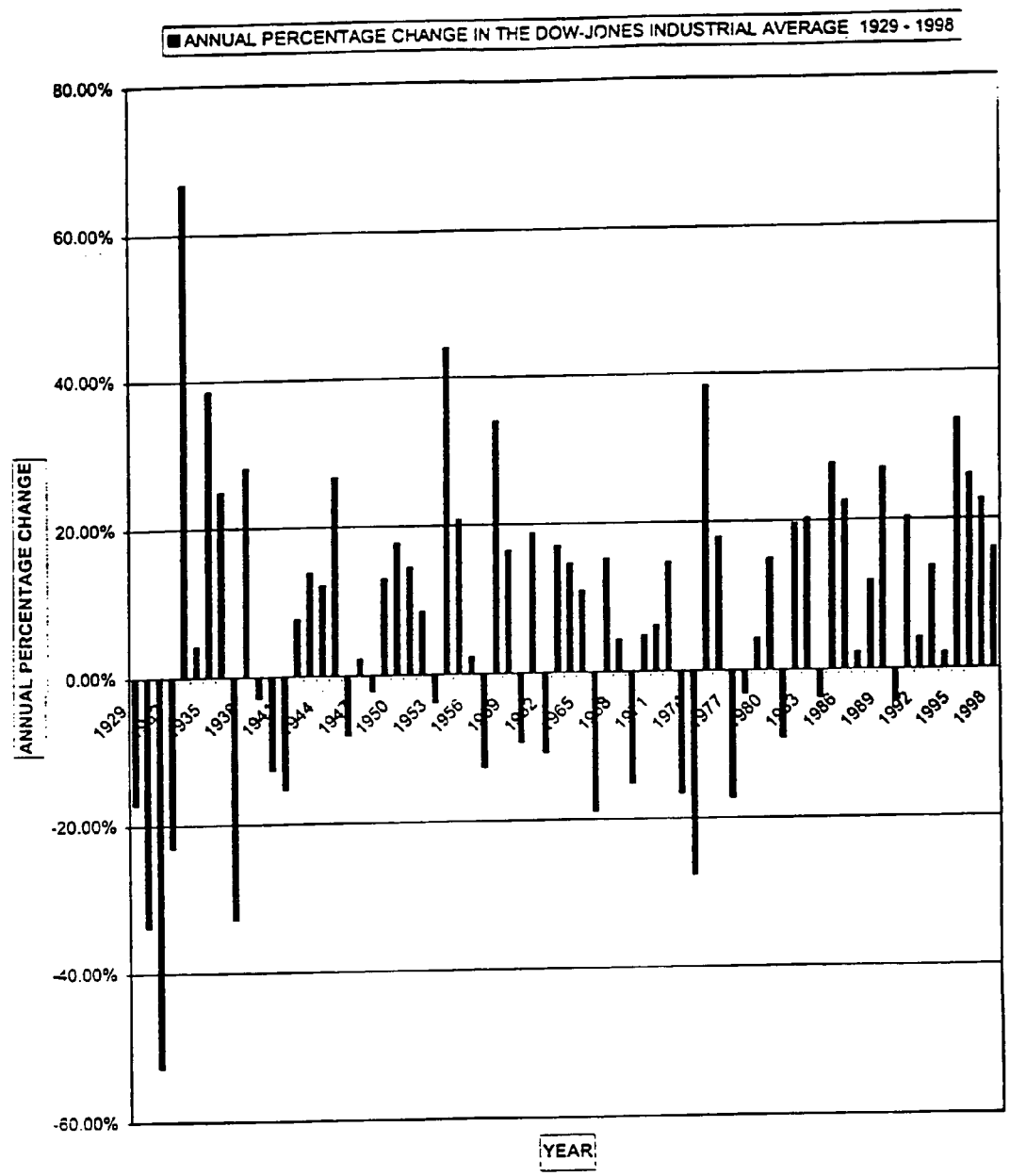
FIG. 9 is a graph of calculations of an example of a procedure consistent with this invention.

FIG. 9 contains a graph 900 entitled "Annual Percentage Change in the Dow Jones Industrial Average 1929 to 1998." This illustrates the degrees of volatility that have occurred during this time period.

Figure 10:
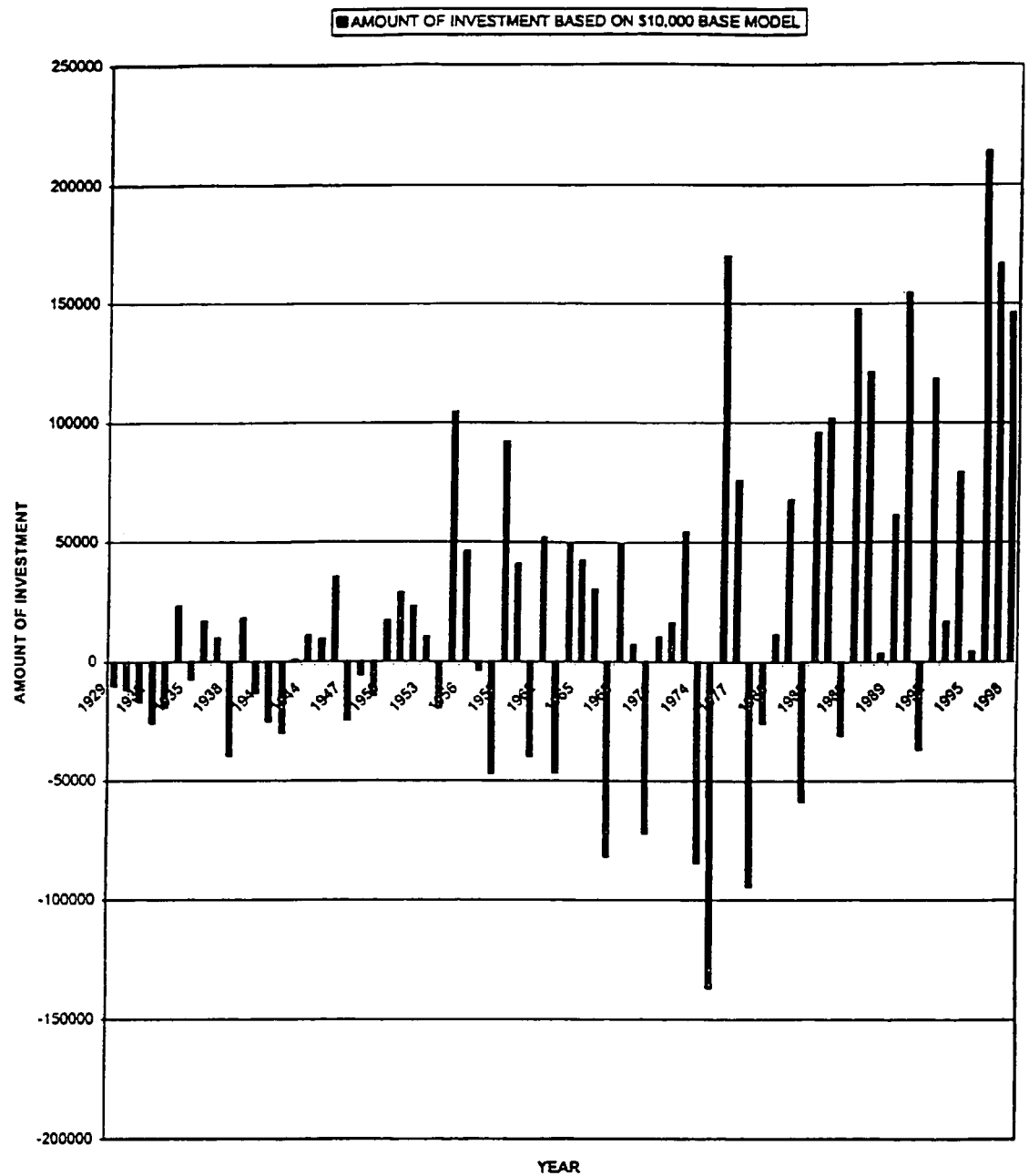
FIG. 10 is another graph of calculations of an example of a procedure consistent with this invention.

FIG. 10 includes a graph 1000 entitled "Amount of Investment Based on $10,000.00 Base Model." This is also based on the Dow Jones Industrial Average and the data used in the previous example.

Figure 11:
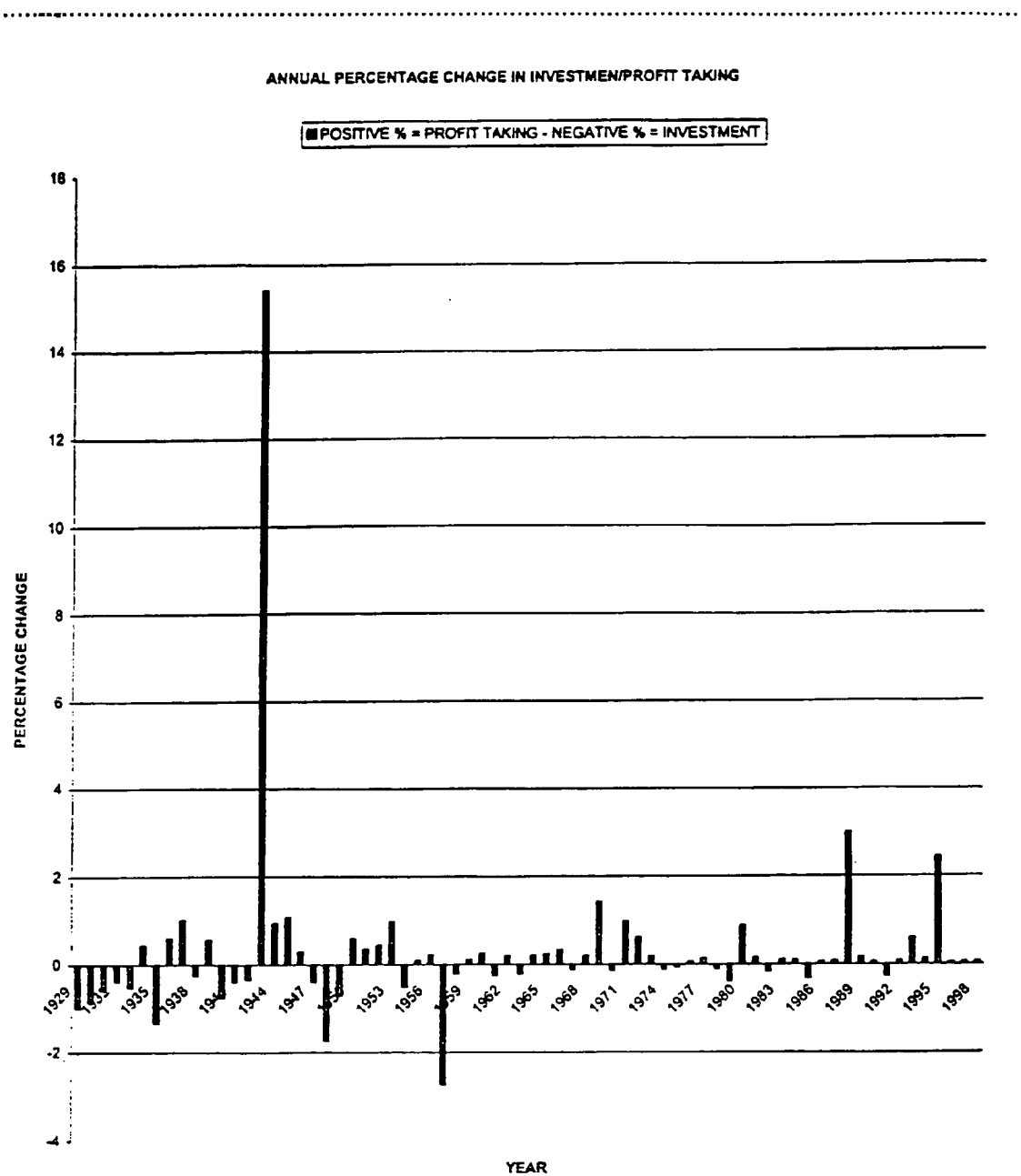
FIG. 11 is yet another graph of calculations of an example of a procedure consistent with this invention.

FIG. 11 includes a graph 1100 entitled "Annual Percentage Change Investments/Profit Taking," and based on the data from the previous example. Graph 1200 shows on a percentage basis the profit taking and the investing as it changes from one year to the next.

FIG. 12 contains a spreadsheet 1200 based on a hypothetical model of a long-term tax-exempt mutual fund. Although the model is hypothetical, the percentage of annual income earned is real and the change in share value from one year to the next is also real. The methodology is the same except for the fact that we now have an equity component in the share value of the fund and an income component paid out.

Figure 13:
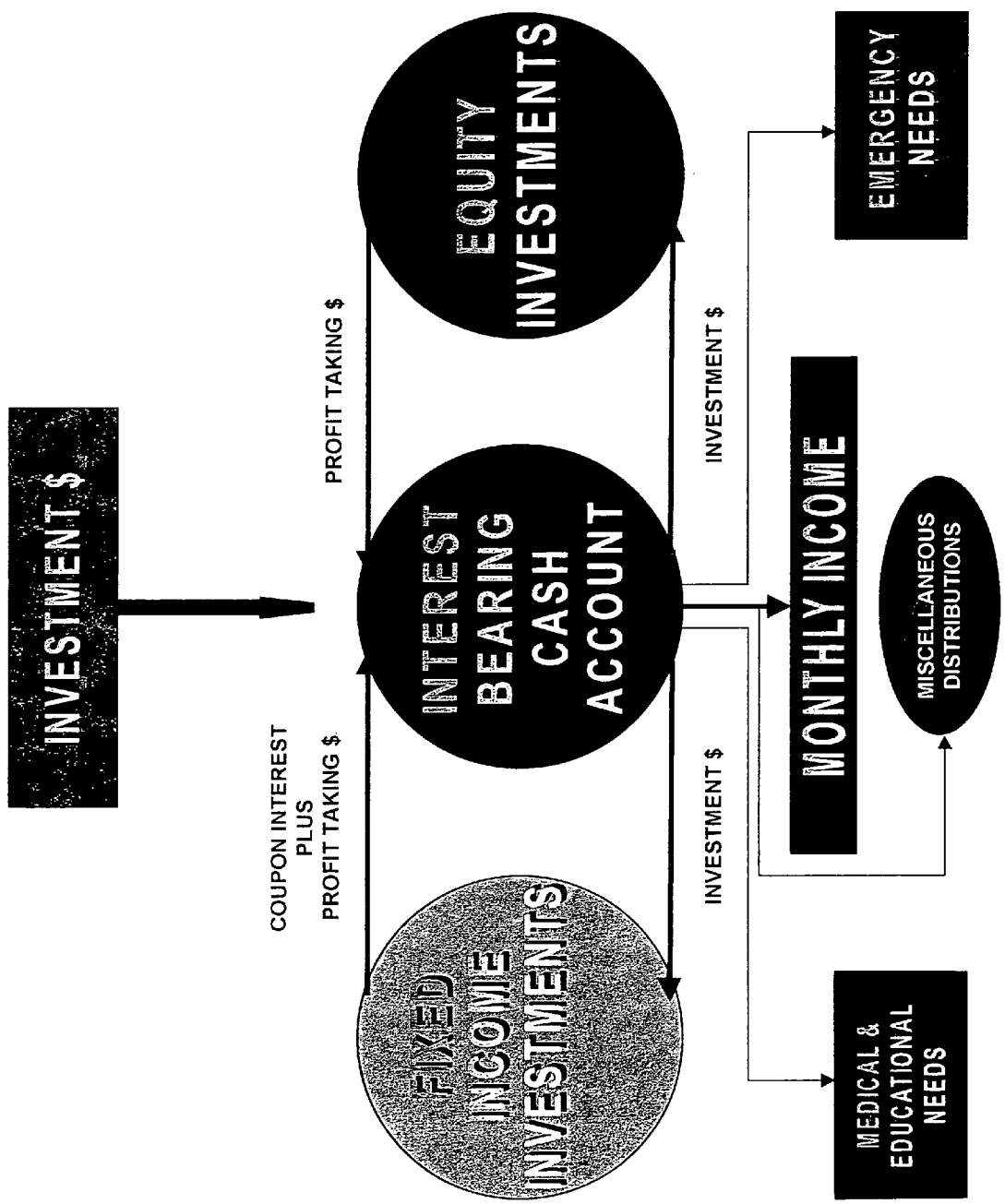
FIG. 13 is another table of values for an example of a procedure consistent with this invention.

FIG. 13 contains a chart 1300 showing the flow of dollars between the different accounts and also possible applications for utilization of the funds. This is designed for the individual investor. Over a 20-year period, this example needed a 16.7362 ratio of the Safety Reserve to the investment unit. The average percentage income returns for the year was 7.58%. The average annual investment was $8,368.08 per year and the average annual income was $7,429.06 per year.

Working with averages and assuming that the income offset the investments shows a net annual investment of $939.02 per year, which built an end actual equity balance of $201,720.00 at the end of 20 years. This is equivalent to a 21.157% average rate of return on the equity investment.

Obviously, systems and methods consistent with this invention can use a myriad of investment vehicles as long as they have an active trading market and a price that can be readily established, and they can be held for as long as is necessary. Such vehicles could include stocks meeting the above criteria, bonds (preferably noncallable and including, but not limited to, treasury bonds, municipal bonds, corporate bonds and even junk bonds), stock, bond or real estate mutual funds, mutual funds of any nature so long as they are open-ended funds, certain types of annuities, collectibles, Certificates of Deposit, American depository receipts, real estate investment trusts, and foreign currencies. This, of course, is not all-inclusive, but is instead merely exemplary.

Systems and methods consistent with this invention could be used for a variety of purposes. Examples of persons who could especially benefit are personal injury victims or retirees who have received a lump sum award and need the safety of principal and income that will grow in proportion to inflation in the future, 401K Plan and IRA participants who wish to take their profits but not get out of the market, Keogh participants, profit sharing participants, and those in profit sharing plans or money purchase pension plans. Also, private investors with large profits that are afraid to get out of the market, or those who finally want to get into the market may also benefit. In addition, virtually any qualified retirement plan, be it corporate or labor union or a small company, deferred compensation plans, educational endowments, church or temple endowment or building funds and private foundations could benefit as well. In other words, any investor of any type looking to limit their downside risk while keeping their upside potential, altering irrevocably the traditional risk reward ratio.

In the case of any qualified retirement plans that are showing huge profits right now, all of the equity holdings could be liquidated, realizing a profit, but without having any taxation on the profit because it would be internal to the tax-qualified plan. They could then start putting the money back into the plan utilizing this methodology on a much safer basis. They could do this for the entire investment or just compute the invested capital and take a reasonable rate of return such as that on treasure bonds etc. or they can lock in their entire profit and leave the rest in and then take their profit and funnel it back in on a safer basis.

What is claimed is:

1. A method, executed by a data processing system, for controlling an investment vehicle, comprising:
    determining a value of the investment vehicle at predetermined intervals;
    comparing the determined value against a predefined investment target at each of the predetermined intervals;
    making an additional investment in the investment vehicle automatically if the value fails to reach the investment target, the amount of the additional investment depending upon the amount by which the value fails to reach the investment target; and
    liquidating part of the investment vehicle automatically if the value exceeds the investment target, the part of the investment vehicle that is liquidated depending upon the amount by which the value exceeds the investment target.

2. The method of claim 1, further including increasing the target at each of the predetermined intervals.

3. The method of claim 2, wherein increasing the target includes increasing the target by a fixed amount.

4. A method, executed by a data processing system, for controlling an investment vehicle, comprising:
    determining a value of the investment vehicle at predetermined intervals;
    comparing the determined value against a predefined investment target at each of the predetermined intervals;
    increasing the target at each of the predetermined intervals by a fixed percentage;
    making an additional investment in the investment vehicle automatically if the value fails to reach the investment target, the amount of the additional investment depending upon the amount by which the value fails to reach the investment target; and
    liquidating part of the investment vehicle automatically if the value exceeds the investment target, the part of the investment vehicle that is liquidated depending upon the amount by which the value exceeds the investment target.

5. The method of claim 1, further including creating a liquid account.

6. The method of claim 5, wherein making an additional investment includes
    removing funds from the liquid account.

7. The method of claim 5, wherein liquidating part of the investment vehicle includes
    adding the liquidated funds to the liquid account.

8. The method of claim 1 wherein making an additional investment includes
    making an additional investment equal to the difference between the target and the determined value.

9. The method of claim 1 wherein liquidating part of the investment vehicle includes
    liquidating part of the investment vehicle equal to the difference between the determined value and the target.

10. The method of claim 1, wherein making an additional investment includes
    making an additional investment in proportion to the amount that the determined value fails to reach the target.

11. The method of claim 1 wherein liquidating part of the investment vehicle includes
    liquidating part of the investment vehicle in proportion to the amount that the determined value exceeds the target.

* * * * *